United States Patent Office 2,887,436
Patented May 19, 1959

2,887,436

PHARMACEUTICAL COMPOSITIONS

Oscar Klioze, Floral Park, and Jerome T. Liebrand, Brooklyn, N.Y., assignors to Chas. Pfizer & Co., Inc., New York, N.Y., a corporation of Delaware No Drawing. Application May 28, 1956
Serial No. 587,502

5 Claims. (Cl. 167—81)

This invention relates to pharmaceutical compositions and a process for preparing the same, and more particularly, to vitamin and/or mineral compositions which are useful as dietary supplements and in correcting existing nutritional deficiencies. More specifically, the invention relates to pharmaceutical compositions in the form of a rapidly disintegrable, pleasant tasting flavored tablet, containing in unit dosage the essential vitamins and/or minerals necessary to meet the human minimum daily requirements for these vital substances.

Most vitamins and minerals today are administered in the form of capsules or tablets, although elixirs have been employed to some extent. However, elixirs have the disadvantage of poor stability if an aqueous medium is employed, and unpleasant taste or sensation if the vehicle contains an oil. In addition, many tablets are not readily absorbed due to their inability to disintegrate at a sufficiently rapid rate. The most common dosage form is the gelatin capsule containing the necessary vitamins and minerals in an oil suspension. Unfortunately, the provision of the minimum daily requirements of the substances in one capsule or tablet results in a relatively large object for the consumer of the item to swallow. This problem is particularly troublesome in the case of children, where the administration of any medicament is often complicated.

It is therefore, an object of this invention to provide a vitamin and/or mineral-containing tablet which meets the deficiencies of ordinary tablets, capsules, and other dosage forms of this type. A further object is to provide a multipurpose tablet of the character described, which may readily be swallowed whole, chewed without objectionable taste, dissolved in the mouth, or dissolved in liquids such as infant formula and fruit juices for administration to infants and children, without the gritty aftertaste characteristic of many ordinary vitamin-mineral preparations.

These and other objects are accomplished by the present invention, which provides a rapidly disintegrable, pleasant-tasting tablet comprising a plurality of compressed granules containing vitamins and/or minerals, and a sweetening agent, the incompatible vitamins and minerals being incorporated in different granules and bound therewithin by a water-soluble edible gum, forming more slowly distintegrable granules than the sweetening agent-containing granules, and a flavoring agent in the interstices between such granules.

The tablets of this invention are prepared by first separating the incompatible vitamins and minerals from one another, and then forming granules thereof by means of a suitable granulating technique, preferably by wet granulation. For this purpose, the medicaments are first thoroughly blended with a pharmacologically acceptable binding agent, and wet down with a solvent in an amount sufficient to render the mass suitable for passage through a granulating machine. After this, the granules are dried, preferably under vacuum.

A wide variety of natural and synthetic edible gums are suitable as binding agents in the preparation of the aforesaid granules. However, while the natural gums are quite useful, it is preferred to employ certain synthetic gums due to their more uniform properties and binding characteristics. A particularly advantageous synthetic gum is polyvinylpyrrolidone (PVP), a high molecular weight polymer formed by the polymerization of vinylpyrrolidone by methods well known in the art. This product is commercially available under the trademark "Plasdone." For the purposes of this invention, polyvinylpyrrolidone, having a K value ranging from about 26 to 36 is especially useful. The K value expresses the degree of polymerization of the polyvinylpyrrolidone, and is calculated from the relative viscosity or ratio of the viscosity of a dilute solution of PVP (such as a 1% solution) to the viscosity of the solvent i.e., water. A preferred form of polyvinylpyrrolidone exhibits a K value of 30, corresponding to an average molecular weight of 40,000. Other synthetic gums which may be employed for the purposes described are carboxymethylcellulose (CMC), and salts thereof, such as sodium carboxymethylcellulose; methyl cellulose; and certain polycarboxylic acid derivatives sold under the trademark "Carbopol" by the B. F. Goodrich Company. Among the natural gums which may be employed are pectin, acacia, agar, tragacanth and the alginates, such as sodium alignate.

The binding agent is applied to the vitamins and/or minerals in an inert solvent, such as water or suitable organic solvents. It is important that the solvent be one which does not adversely affect the therapeutic agents to be mixed therewith. The lower alkanols, such as ethanol, butanol and isopropanol are particularly useful for this purpose, and mixtures thereof with water are also suitable. In addition halogenated hydrocarbons, such as carbon-tetrachloride and ethylene dichloride, may also be employed to advantage.

After formation of the granules, drying may be accomplished simply by application of vacuum to the wet granules, or by blowing hot air through the mass during agitation. If desired, the air may be sterilized in any convenient manner, as by filtration and/or heat sterilization. The temperature of the air as it contacts the granules should be carefully regulated to avoid destruction or loss in potency of the therapeutic agent, a temperature from about 20 to 100° C. being satisfactory for most purposes. In some instances, a more elevated temperature may be employed if an inert gas such as nitrogen or carbon dioxide is used in lieu of air for drying purposes. Upon completion of the drying, the granules are preferably screened, to insure that they are of an optimum size for the formation of tablets. It has been found that granules ranging from about 20 to 100 mesh are most advantageous in preparing the tablets of this invention.

As stated, the sweetening agent is incorporated in separate granules that disintegrate more rapidly than those containing the vitamins and/or minerals. Both natural sweetening agents such as sucrose, and synthetic sweetening agents such as saccharin and the sodium salt thereof, and sodium cyclohexyl sulfamate (Sucaryl) may advantageously be employed. The synthetic sweetening agents have been found to be most effective in masking the objectionable taste of the vitamins and minerals. In preparing the sweetening agent-containing granules, it is preferred to employ materials which will rapidly dissolve upon contact with water or saliva. For this purpose, various sugars and sugar alcohols have been found to be advantageous, i.e., lactose, sucrose, sorbitol and mannitol. Certain of these, of course, impart added sweetness to the granules. All of them act as both binding agents and as fillers to bring the granule to the appropriate size for subsequent tabletting.

The sweetening agent-containing granules are prepared in a manner similar to the procedure described above for preparing the medicament-containing granules. However in this case, it has been found that granulation is more readily effected if a mixture of water and a lower alkanol solvent is employed for wetting the granulation mass. A 66% w./v. solution of isopropanol in water has been found to be especially useful in this connection. After preparation of the granules, they are dried in the manner previously indicated, and screened, preferably to obtain granules of the same order of size specified for the medicament-containing granules, i.e. between about 20 and 100 mesh. After drying and screening of all of the granules, they are blended together in the appropriate proportions for tabletting purposes. During this blending operation, other vitamins and/or minerals which do not have an objectionable taste may be added, care being taken not to introduce a large proportion of finely divided material, since this would impair the tabletting operation. It is especially useful to add vitamins already in granular form, such as gelatin-protected vitamins A and D which are available in the form of fine beadlets. Other agents which may be employed at this stage are fillers, such as starch, particularly potato, tapioca and rice starch. These materials act as disintegrants for the finished tablet and facilitate rapid disintegration of the tablet upon contact with liquids or saliva. It is an especially important feature of this invention to include in the final blending operation suitable flavoring agents which become dispersed in the interstices between the blended granules and the granules contained in the ultimate tablet. In this manner, the flavoring agent is made promptly available upon disintegration of the tablet so that the objectionable taste of the vitamins and/or minerals is promptly and effectively masked. Upon completion of the blending operation, the material is subjected to tabletting in the usual manner, preferably with the addition of a lubricant, such as stearic acid or magnesium stearate, to form a finished tablet containing a predetermined quantity of vitamins and/or minerals per unit dosage form.

While the tablets of this invention are particularly suitable for children, they may be administered to both children and adults, and the preferred vitamin and mineral dosages set forth herein are those generally applicable to both. Moreover, the proportions and concentrations referred to are the daily dosage of each vitamin or mineral advantageously employed in the most preferred composition of the invention. The essential vitamins herein referred to are vitamins A, B, C and D, which are present in such variable quantities in ordinary food that deficiencies in one or more of such vitamins often takes place in the case of persons on unbalanced diets.

Vitamin A is known to have important functions in connection with vision epithelial tissues and growth. Its function, particularly in connection with growth, is of course, closely correlated with the body mechanisms involved in the utilization of fat, as well as carbohydrates and proteins. The minimum daily requirement (i.e., the MDR) of vitamin A has been established and is 4,000 USP units for adults and 3000 USP units for children. Accordingly, the amount of vitamin A that is combined with one day's dosage of the composition of the invention may range from about 4,000 USP units to about 8,000 USP units. It is, of course, to be understood that the instant invention does not exclude use of a substantially greater amount of vitamin A, for example, as much as 50,000 USP units, which may be employed in the case of a severe vitamin A deficiency. However, since the purpose of the instant invention is to supply an amount of vitamin A sufficient to effectively supplement the diet, the amount of vitamin A which is ordinarily required for the purposes of the instant invention ranges from 100% to 350% of the minimum daily requirements. The preferred amount of vitamin A is about 5,000 USP units, or 125% of the adult MDR. (As used herein, the dosages of the various vitamins and minerals are dosages based upon the daily dosage of the composition unless otherwise designated.) A particularly useful form of vitamin A is that sold under the trademark "Crystalets." This product consists of discrete beadlets of gelatin, containing crystalline vitamin A acetate in varying proportions. An especially useful type has a particle size of from 74 to 200 microns and contains approximately 500,000 units of vitamin A per gram.

Vitamin B, as used generally (sometimes referred to as "Vitamin B Complex"), comprises a group of essentially water-soluble factors or enzymes present in yeast, liver and whole grain; and such factors are known to have a number of different functions in connection with the nervous and circulatory system. The factors or enzymes of vitamin B include thiamin hydrochloride or mononitrate, riboflavin, cyanocobalamine or hydroxy cobalamine, nicotinic acid (and niacinamide or nicotinic acid amide), pantothenic acid, choline, folic acid, and various separately designated vitamins such as vitamins I, J, L, M, U and W. Each of the foregoing species of vitamin B has also been given other names or designations, such as vitamin $B_1$, $B_2$, $B_{12}$ etc. It has been found that each of the foregoing enzymes or factors participates, in combination with other more complex enzymes, in the carrying out of the vital body functions.

Vitamin $B_1$, available as thiamine mononitrate or thiamin hydrochloride, is a well-known species of vitamin B whose function is directly connected with the nervous and circulatory systems. The MDR of vitamin $B_1$, has been established as one mg. for adults and 0.5 to 0.75 mg. for children. In the instant invention, the amount of vitamin $B_1$ used should range from about one mg. to about three mg. (i.e., 100–300% of the adult MDR). The use of amounts of vitamin $B_1$ substantially in excess of that range is, of course, not excluded in the case of persons suffering a severe deficiency of vitamin $B_1$.

Vitamin $B_2$ or riboflavin is one of the relatively heat stable factors of vitamin B. The adult MDR of riboflavin is 2.0 mg. and the amount of riboflavin that may be used in the practice of the instant invention ranges from about 1.0 mg. to about 3 mg., the preferred amount being about 2.0 mg.

While the need for niacinamide has been established, the MDR has not. However, it has been found that the preferred amount of niacinamide for use in the instant invention is about 12 mg. Higher or lower amounts, such as from about 5 mg. to about 30 mg. may of course be employed.

The MDR for pantothenic acid, also a species of vitamin B, has not been established. However, pantothenic acid is advantageously incorporated in the composition in the form of calcium pantothenate. The amount of calcium pantothenate that may be used in the practice of the instant invention ranges from about 1 mg. to about 10 mg. and the preferred amount is about 2 mg.

The need for vitamin $B_6$ in human nutrition has been established, but the MDR has not. Pyridoxine hydrochloride is an advantageous form of vitamin $B_6$ which may be used in the practice of the present invention. The amount employed ranges from about 0.2 mg. to about 2 mg., the preferred amount being about 1.0 mg.

The need for vitamin $B_{12}$ in human nutrition has been established, but the MDR has not. The amount of vitamin $B_{12}$ which is used may range from 1 to 10 mcg., although 2 mcg. is adequate for most purposes.

The other species of vitamin B hereinbefore referred to may also be incorporated in the composition of the instant invention; however, the need for these species in human nutrition has not been definitely ascertained. Accordingly, the composition of the invention preferably contains only those six species of vitamin B last mentioned, although the composition may contain all of the species of vitamin B mentioned herein, for example, in the form of the so-called vitamin B complex.

Vitamin C, or 1-ascorbic acid, is well known as the vitamin which prevents scurvy and it is also very important in the growth processes, particularly the growth of bones and teeth. Raw fruits and vegetables are ordinarily good sources of vitamin C. The adult MDR of vitamin C is 30 mg. and the MDR for children is 20 mg. The amount of vitamin C that may be used in the practice of the instant invention ranges from about 20 mg. to about 100 mg. The preferred amount of vitamin C is about 50 mg. or 167% of the adult MDR. It is preferred to employ salts of ascorbic acid, such as sodium and calcium ascorbate, to provide a finished product of improved taste.

Vitamin D may be obtained naturally from fish oils or synthetically by irradiation of 7-dehydrocholesterol or ergosterol. The MDR of vitamin D is 400 USP units and the amount of vitamin D that may be used in the instant invention ranges from about 400 to about 1000 USP units. The preferred amount is about 1000 USP units. As in the case of vitamin A, vitamin D is available in the form of gelatin beadlets under the trademark "Crystalets." An especially useful type contains about 500,000 units/gm. vitamin A activity and 100,000 units/gm. vitamin D activity in beadlets ranging from about 74 to 200 microns in size.

Vitamins other than the aforementioned vitamins A, B, C and D may also be incorporated in the composition of the instant invention. However, it has been found that deficiencies are most likely to occur in the case of one or more of the vitamins A, B, C and D in ordinary cases and, accordingly, the need for other vitamins involves essentially special considerations or peculiar circumstances not necessarily involved herein.

The minerals which are most likely to be deficient in the human system include iodine (I), manganese (Mn), cobalt (Co), potassium (K), molybdenum (Mo), iron (Fe), Copper (Cu), zinc (Zn), magnesium (Mg), calcium (Ca), and phosphorus (P). Many of these minerals are advantageously employed in the form of their corresponding gluconates to enhance the taste acceptance of the resulting product.

The MDR of iodine is about 0.1 mg., and the amount of iodine which may be used in the instant invention ranges from about 0.05 mg. to about 0.2 mg., the preferred amount being about 0.05 mg. Advantageously, iodine is incorporated in the composition in the form of one of its salts, as for example, potassium iodide. About 0.066 mg. of potassium iodide (USP) is equivalent to 0.05 mg. of iodine.

The MDR of manganese has not yet been definitely established. The amount of manganese to be used in the instant invention ranges from about 0.02 mg. to about 1.5 mg. The preferred amount of manganese for use in the instant invention is about 0.028 mg. Manganese is advantageously incorporated in the composition in the form of salts thereof, such as manganese carbonate, manganese gluconate and manganese sulfate. About 0.058 mg. of manganese carbonate is equivalent to 0.028 mg. of manganese.

The MDR of cobalt has not yet been ascertained. The amount of cobalt that may be used in the instant composition may range from about 0.01 mg. to about 0.2 mg. The preferred amount of cobalt being about 0.014 mg. Cobalt is most readily incorporated in the composition in the form of one of its salts, such as cobaltous carbonate, cobaltous gluconate or cobaltous sulfate. About 0.025 mg. of cobaltous carbonate is equivalent to 0.014 mg. of cobalt.

The MDR of potassium has not yet been ascertained. The amount of potassium used in the instant composition (in conjunction with potassium iodide) may range from about 0.01 mg. to about 10 mg. Potassium is also advantageously incorporated in the composition in the form of one of its salts, such as potassium gluconate or potassium sulfate.

The amount of molybdenum that may be used in the practice of the instant invention ranges from about 0.005 mg. to about 0.5 mg. Ordinarily molybdenum is incorporated in the form of one of its salts, such as sodium molybdate. About 0.025 mg. of sodium molybdate ($Na_2MoO_4.2H_2O$) is equivalent to 0.01 mg. of molybdenum, which is the preferred amount. The MDR has not yet been ascertained.

The MDR of iron is 10 mg. for adults and 7.5 for children 1 to 6 years old. The amount of iron that may be used in the instant invention ranges from about 1.0 mg. to about 20 mg. The preferred amount of iron for use in the invention is about 1.0 mg., the iron being incorporated in the form of one of its salts, as for example, ferrous gluconate or ferrous sulfate or as finely divided reduced iron.

The MDR of copper has not yet been ascertained. The amount of copper that may be used in the instant invention ranges from about 0.05 mg. to about 2 mg. The preferred amount of copper for use in the instant composition is about 0.07 mg. The copper is also incorporated in the form of copper oxide or one of its salts, as for example cupric gluconate or cupric sulfate. About 0.079 mg. of red copper oxide is equivalent to 0.070 mg. of copper.

The MDR of zinc has not yet been ascertained. The amount of zinc that may be used in the instant invention ranges from about 0.05 mg. to about 2.0 mg. The preferred amount of zinc is about 0.071 mg. Zinc is readily incorporated in the composition in the form of zinc oxide or one of its salts, zinc gluconate or zinc sulfate. About 0.089 mg. of zinc oxide is equivalent to 0.071 mg. of zinc.

The MDR of magnesium has not yet been ascertained. The amount of magnesium that may be used in the instant invention ranges from about 0.1 mg. to about 10 mg. The preferred amount of magnesium is about 0.108 mg. Advantageously, magnesium is also incorporated in the composition in the form of magnesium oxide, one of its salts, such as magnesium gluconate or magnesium sulfate. About 0.180 mg. of magnesium oxide is equivalent to 0.108 mg. of magnesium.

It will be appreciated that other essential minerals, such as calcium and phosphorus may also be included, usually in amounts substantially less than their MDR because many foods contain these minerals. In the case of children who ordinarily consume rather substantial amounts of milk and milk products rich in these minerals, it is possible to omit or reduce the quantities of these particular minerals in the instant composition. The MDR of each of these minerals has been established as 750 mg. for both children and adults. In the instant invention, it is preferred to employ a lesser proportion, say, 10 to 50% of the MDR in each case. Calcium phosphate is especially useful in providing both calcium and phosphorus. About 900 mg. of calcium phosphate provides approximately 213 mg. of calcium and 165 mg. of phosphorus.

As is well known, many vitamins and minerals are incompatible with one another, particularly in the presence of water, and many methods have been employed to prevent destruction of such incompatible materials. For example, vitamin $B_1$ is readily destroyed by alkalies and alkaline salts and, therefore, presents a problem if compounded directly with certain mineral salts. Vitamin $B_1$ is also incompatible with copper salts. In addition, vitamin $B_{12}$ is destroyed by reducing agents. Vitamin C, in turn, is inactivated by oxidizing agents and also deteriorates in the presence of copper and iron salts. Moreover, ferrous gluconate is a reducing agent, and, therefore, readily inactivates those vitamins which are susceptible to such reducing action.

The manner in which this problem of incompatibility is met by this invention is illustrated by the following example, it being understood however that the invention is not to be limited thereby since many modifications and embodiments may be made without departing from the spirit and scope thereof.

A series of blends were prepared with the following ingredients in the proportions by weight specified.

Blend A

| Ingredients: | Mg./tablet |
|---|---|
| Thiamine mononitrate | 1.150 |
| Riboflavin | 2.140 |
| Niacinamide | 13.200 |
| Pyridoxine HCl | 1.100 |
| Calcium pantothenate | 2.500 |
| Vitamin B-12 mannitol triturate | 4.000 |

Blend B

| Ingredients: | |
|---|---|
| Manganese carbonate | .058 |
| Magnesium oxide | .180 |
| Cobalt carbonate, basic | .025 |
| Red copper oxide | .079 |
| Zinc oxide | .089 |
| Potassium iodide | .066 |
| Sodium molybdate | .025 |
| Reduced iron | 1.000 |

Blend C

Ingredients: Sodium ascorbate _____ 61.820

Blend D

| Ingredients: | |
|---|---|
| Mannitol | 180.000 |
| Sodium saccharin | 5.000 |
| Sodium sucaryl | 5.000 |

Blend E

| Ingredients: | |
|---|---|
| Vitamin A and D Crystalets | 12.000 |
| Rice starch | 50.000 |
| Dohyfral | 9.000 |
| Flavor (source of vitamin $D_2$) | 10.000 |

Each of the foregoing blends A, B and C was thoroughly wetted with a 10% solution of polyvinylpyrrolidone (PVP) in isopropyl alcohol. The mass was then thoroughly mixed and passed through 3/32 inch holes in a rotary wet pack granulator. The resulting granules were then dried in a vacuum drier without heat for 24 hours and passed through a 14 mesh stainless steel screen.

Blend D was wetted down with a 66% w./v. solution of isopropyl alcohol in water and thoroughly mixed. The resulting granules were then subjected to granulation as previously described and the granules were dried at 50° C. for four hours. These were screened as described above and blended with the granules resulting from blends A, B, and C. During this last blending operation, blend E was added, along with about 7.0 mg. per tablet of magnesium stearate to act as a lubricant during tabletting. Upon completion of the final blending operation, the material was compressed into tablets, using a 13/32 inch standard round concave punch.

Each of the resulting tablets was found to provide the following vitamins and minerals in the proportions by weight specified:

| Material: | Potency |
|---|---|
| Vitamin B-1 | 1.0 mg./tablet. |
| Vitamin B-2 | 2.0 mg./tablet. |
| Niacinamide | 12.0 mg./tablet. |
| Vitamin B-6 | 1.0 mg./tablet. |
| Calcium pantothenate | 2.0 mg./tablet. |
| Vitamin B-12 | 2 mcg./tablet. |
| Vitamin C | 50.0 mg./tablet. |
| Vitamin A | 5000 units/tablet. |
| Vitamin D | 1000 units/tablet. |
| Manganese | 0.028 mg./tablet. |
| Magnesium | 0.108 mg./tablet. |
| Cobalt | 0.014 mg./tablet. |
| Copper | 0.070 mg./tablet. |
| Zinc | 0.071 mg./tablet. |
| Potassium | 0.016 mg./tablet. |
| Iodine | 0.050 mg./tablet. |
| Molybdenum | 0.010 mg./tablet. |
| Iron | 1.00 mg./tablet. |

The tablets so prepared were pleasant-tasting and disintegrated rapidly upon introduction to the mouth or to other fluids. It was found that they were really chewed or swallowed without chewing since the rapid disintegration upon introduction to the mouth promoted the flow of digestive juices which in turn facilitated swallowing of the tablets. Upon testing in a Stohl-Gershberg apparatus the tablets completely disintegrated in less than 5 minutes.

What is claimed is:

1. A rapidly disintegrable, pleasant-tasting, flavored tablet comprising a plurality of compressed granules containing an active pharmaceutical agent selected from the group consisting of vitamins, nutritionally desirable minerals and mixtures thereof and a plurality of separate granules containing sweetening agent, the incompatible vitamins and minerals being incorporated in different granules and bound therewithin by a water-soluble edible gum, forming more slowly disintegrable granules than said sweetening agent-containing granules; and a flavoring agent in the interstices between said granules.

2. A rapidly disintegrable, pleasant-tasting, flavored vitamin-mineral tablet comprising a plurality of compressed granules containing vitamins and minerals and a plurality of separate granules containing sweetening agent, the incompatible vitamins and minerals being incorporated in different granules and bound therewithin by a water-soluble edible gum, forming more slowly disintegrable granules than said sweetening agent-containing granules, and a flavoring agent in the interstices between said granules.

3. A rapidly disintegrable, pleasant-tasting, flavored vitamin-mineral tablet comprising a plurality of compressed granules containing vitamins and minerals and a plurality of separate granules containing sweetening agent, the incompatible vitamins and minerals being incorporated in different granules and bound therewithin by polyvinylpyrrolidone, forming more slowly disintegrable granules than said sweetening agent-containing granules, and a flavoring agent and starch disintegrant in the interstices between said granules.

4. A rapidly disintegrable, pleasant-tasting, flavored vitamin-mineral tablet comprising a plurality of compressed granules containing vitamins and minerals and a plurality of separate granules containing sweetening agent, the incompatible vitamins and minerals being incorporated in different granules and bound therewithin by polyvinylpyrrolidone, forming more slowly disintegrable granules than said sweetening agent-containing granules, and a flavoring agent and starch disintegrant in the interstices between the granules, said tablet containing the following vitamins and minerals in approximately the proportions by weight specified:

| Material: | Potency |
|---|---|
| Vitamin B-1 | 1.0 mg./tablet. |
| Vitamin B-2 | 2.0 mg./tablet. |
| Niacinamide | 12.0 mg./tablet. |
| Vitamin B-6 | 1.0 mg./tablet. |
| Calcium pantothenate | 2.0 mg./tablet |
| Vitamin B-12 | 2 mcg./tablet. |
| Vitamin C | 50.0 mg./tablet. |
| Vitamin A | 5000 units/tablet. |
| Vitamin D | 1000 units/tablet. |
| Manganese | 0.028 mg./tablet. |
| Magnesium | 0.108 mg./tablet. |
| Cobalt | 0.014 mg./tablet. |

| Material: | Potency |
|---|---|
| Copper | 0.070 mg./tablet. |
| Zinc | 0.071 mg./tablet. |
| Potassium | 0.016 mg./tablet. |
| Iodine | 0.050 mg./tablet. |
| Molybdenum | 0.010 mg./tablet. |
| Iron | 1.00 mg./tablet. |

5. A process for preparing a rapidly disintegrable, pleasant-tasting, flavored vitamin-mineral tablet comprising the steps of forming a plurality of granules containing said vitamins and minerals bound together with a water-soluble edible gum, the incompatible vitamins and minerals being separated from one another in different granules; forming a more rapidly disintegrable granule containing a sweetening agent and a binder selected from the group consisting of sugar and sugar alcohols; blending all of said granules with a flavoring agent and a starch disintegrant; and compressing the resulting blend into tablets.

References Cited in the file of this patent

UNITED STATES PATENTS

| | | |
|---|---|---|
| 2,410,417 | Andersen | Nov. 5, 1946 |
| 2,691,619 | Bavley | Oct. 12, 1954 |

OTHER REFERENCES

Wood: Tablet Manufacture, J. B. Lippincott Co., Philadelphia, 1904, p. 35.